May 31, 1938.  E. G. RAGATZ  2,119,258
METHOD AND APPARATUS FOR REFRIGERATION
Filed Oct. 30, 1936
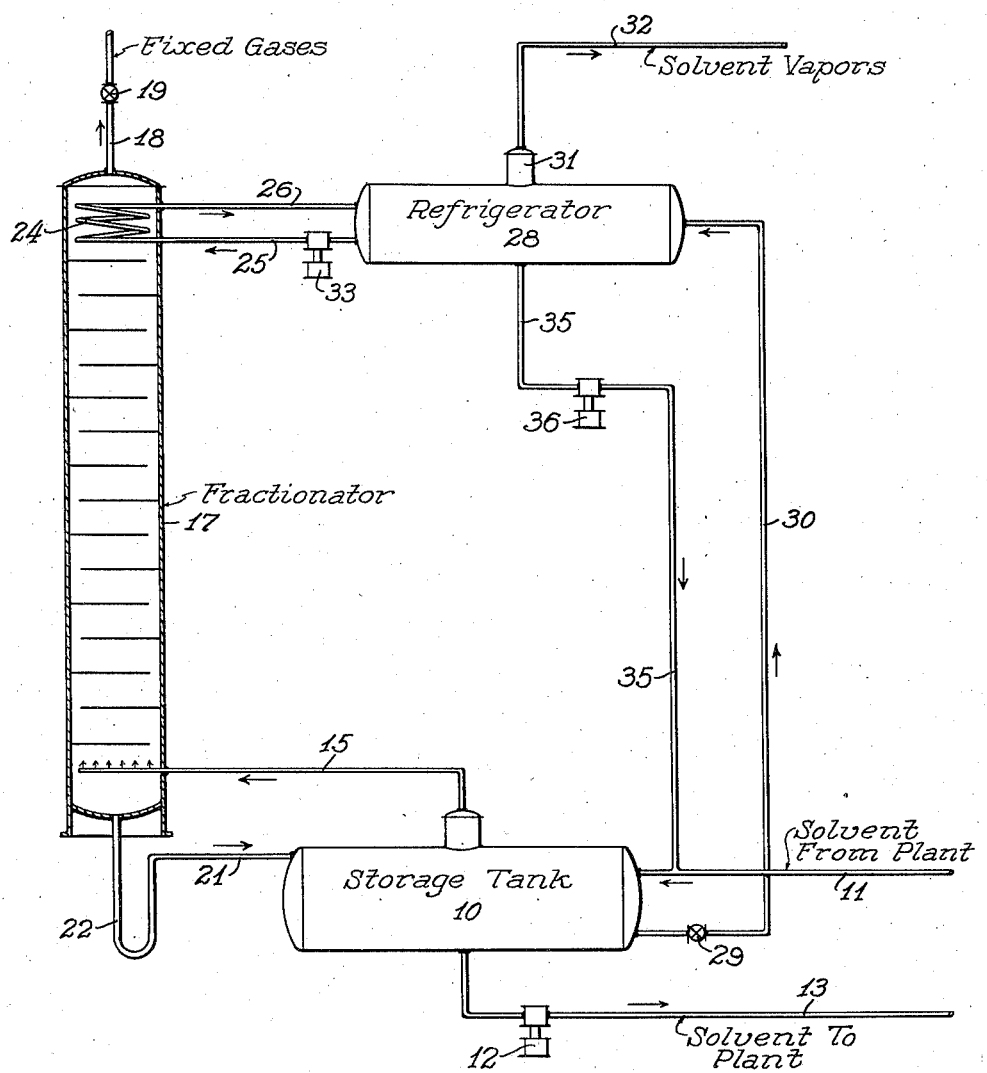
INVENTOR.
Edward G. Ragatz
BY Philip Subkow
ATTORNEY.

Patented May 31, 1938

2,119,258

UNITED STATES PATENT OFFICE 2,119,258

METHOD AND APPARATUS FOR REFRIGERATION

Edward G. Ragatz, Los Angeles, Calif., assignor to Union Oil Company of California, Los Angeles, Calif., a corporation of California Application October 30, 1936, Serial No. 108,451

5 Claims. (Cl. 62—175.5)

The present invention relates to regulating means, and particularly pertains to the control of water concentration in all types of refrigerating structures wherein high water concentrations are undesirable.

Specifically, the invention described herein finds application in solvent extraction plants wherein a solvent is employed to fractionate an oil into its more paraffinic and more naphthenic fractions, respectively. This preferential solvent predominantly found (depending on the solvent itself) in one or the other of the phases thus produced, is then separated from the oil phase as by means of distillation and subsequent condensation. The solvent is then usually sent to a storage tank or "working" tank from which the solvent is withdrawn for further solvent extraction of new quantities of petroleum fractions.

Although not limited to extraction plants employing liquid sulfur dioxide as such selective solvent, the application of the invention will be described hereinbelow in connection with such a plant or structure.

As stated hereinabove, the selective solvent, such as liquid sulfur dioxide is used in a closed cycle. Thus, this solvent may be passed countercurrent to a flow of oil to be treated, the solvent preferentially dissolving the less paraffinic fractions of the oil, and allowing the more paraffinic fractions to be removed as the raffinate phase. The extract phase thus produced contains most, if not all of the liquid sulfur dioxide used as the selective solvent. This solvent may then be removed from the oil dissolved therein either by release of pressure under which the system operates, or by distillation. The vaporized sulfur dioxide is then recondensed and sent to the storage or work tank from which it is withdrawn and sent back into the extraction towers for selective extraction of new quantities of oils, their fractions or distillates.

The liquid sulfur dioxide thus employed repeatedly as a selective solvent becomes after a time saturated more or less with fixed gases, absorbed by said solvent from the treated oils, their fractions or distillates.

Naturally the presence of these fixed gases in the selective solvents is not desirable since it decreases the efficiency of the solvent. It, therefore, becomes necessary to provide for the removal of the fixed gases from the selective solvent of the type of liquid sulfur dioxide.

One of the methods employed for such treatment and revivification of the selective solvent, briefly stated, resides in partial evaporation of the solvent, the overhead vapors comprising the fixed gases in combination with the vapors of the solvent thus partially evaporated. To recover the solvent vapors, the overhead fraction produced from the above mentioned evaporation is usually subjected to fractional refrigeration. For this purpose the solvent vapors together with the fixed gases are passed through a tower provided with a cooling coil for purposes of condensing the solvent vapors such as the sulfur dioxide vapors. These cooling coils are chilled by the passage of a cold solvent, such as cold liquid sulfur dioxide, therethrough. The cooling of the circulated liquid sulfur dioxide is generally accomplished by passing a portion of the liquid sulfur dioxide or similar solvent from the storage or work tank to a refrigerator wherein a portion of the liquid sulfur dioxide for such circulation is evaporated, thus refrigerating the balance of the liquid. This chilled liquid is then circulated through the above mentioned tower thus causing the condensation of the evaporated portion of the sulfur dioxide and its separation from the fixed gases.

The liquid sulfur dioxide employed for the above described solvent extraction and in fact most any selective solvent used for this purpose contains small quantities of water. As long as the percentage of said water in the selective solvent is small, substantially no detrimental action occurs. However, if this water concentration increases to a sufficient degree of concentration, the liquid becomes corrosive in action and otherwise detrimental to the whole system. Therefore, the constant addition of new quantities of selective solvent of the type of liquid sulfur dioxide gradually added to the aforementioned refrigerator employed for the chilling of the evaporated mixture of fixed gases and sulfur dioxide, gradually increases the water content of the liquid sulfur dioxide introduced into said refrigerator until the concentration reaches the corrosive state which is detrimental to the refrigerator, the cooling coils and the other parts of the system.

It is, therefore, the main object of the present invention to provide means for regulating this water concentration of the selective solvent and to prevent the accumulation of water in the refrigerant.

It has now been discovered that this may be accomplished by providing return means whereby a portion of the solvent conveyed from the work tank to the refrigerator may be continually or periodically removed therefrom and preferably returned to the work tank, such a provision prevents the accumulation of water in the refrigerator, thereby removing the danger of the water content in the liquid sulfur dioxide in said refrigerator from exceeding the desired low concentration and from making the solvent-water mixture corrosive.

The invention, therefore, may be broadly stated to reside in a structure of the class described in which the refrigerator employed for the chilling of the medium used for fractional condensation is provided with means for removing continuously or periodically a portion of said chilling medium to prevent the accumulation of excessive quantities of water in said refrigerator. More specifically stated, the invention comprises a storage tank for the solvent employed for selective solvent extraction, means for evaporating a portion of the solvent in said tank to cause the evaporation of a part of the solvent together with the fixed gases contained therein, a fractional condenser adapted to receive said evaporated fractions and to condense the solvent and separate it from the fixed gases, a refrigerator receiving a portion of the solvent from said work tank and adapted to chill said solvent by evaporation of a portion thereof, means communicating with said refrigerator to convey the chilled solvent thus obtained through the condenser to cause the above mentioned fractionation between the sulfur dioxide and the fixed gases evaporated from the work tank and means communicating with said refrigerator to remove continuously or periodically a portion of the solvent conveyed therethrough from the work tank. The invention further resides in communicating the last mentioned means with the work tank whereby the solvent removed from the refrigerator is reconveyed back to the work tank from which the solvent may either be circulated back into the solvent extraction system or may be conveyed to other means for the removal of excessive quantities of water contained in said solvent.

The invention still further comprises the novel construction, combination and arrangement of parts hereinafter more specifically described and shown in the accompanying drawing which illustrates diagrammatically one form of the invention. It is to be understood, however, the invention comprehends changes, variations and modifications which come within the scope of the invention and of the appended claims.

Referring to the drawing, numeral 10 designates a storage or work tank employed for the storage of the selective solvent delivered thereto through line 11 from the solvent extraction plant or apparati after removal of the oil fractions dissolved therein during the solvent extraction operation. Although not limited to any particular solvent, the operations of the drawing and of the invention employed therein will be described in connection with solvent extraction with liquid sulfur dioxide. This solvent thus stored in tank 10 is then conveyed by means of pump 12 through line 13 back to the solvent extraction units or treaters, either directly or after passage through other structures as, for example, those employed for the removal of excess water in said solvent.

As stated previously, the liquid sulfur dioxide after repeated use for solvent extraction purposes, becomes saturated with fixed gases absorbed from the treated oils, fractions or their distillates. To remove these fixed gases a portion of the solvent in tank 10 is evaporated continuously or periodically and is conveyed through line 15 into a fractionator 17 wherein the evaporated sulfur dioxide is condensed as described hereinbelow, while the fixed gases are withdrawn through line 18 provided with a manually operated or automatic valve 19. The sulfur dioxide liquefied in fractionator 17 returns back to tank 10 through line 21 provided with a trap for leg 22 which is normally filled with the liquid sulfur dioxide and prevents the vapors and gases from passing through pipe 21.

Fractionator 17 is provided in its upper portion with a cooling coil 24, the two ends of which communicate by means of pipes 25 and 26, respectively, with a refrigerator 28 chilled with liquid sulfur dioxide delivered to said refrigerator from tank 10 through line 30 provided with a valve 29. This valve regulates the quantity of SO₂ introduced into refrigerator 28. For purposes of chilling the liquid sulfur dioxide in refrigerator 28, dome 31 of said refrigerator is provided with a line 32 through which a portion of the liquid sulfur dioxide is evaporated and may be conveyed to compressors not shown in the drawing. It is thus obvious that the chilled sulfur dioxide circulated through coil 24 and pipes 25 and 26 by means of pump 33, causes the sulfur dioxide vapors entering the fractionator 17 to be condensed. This condensate acts as a reflux to wash the ascending mixture of fixed gases and sulfur dioxide vapors, the fixed gases being withdrawn from the system through line 18, while the condensate is returned to tank 10 through leg 22 in line 21.

As stated previously, the liquid sulfur dioxide used for solvent extraction contains a small quantity of water. As long as this water content remains below a certain limit, it is not detrimental to the equipment since the solvent-water mixture or solution is not corrosive. However, in view of the fact that a portion of the liquid sulfur dioxide conveyed to refrigerator 28 through line 30 is continuously or periodically evaporated to chill the sulfur dioxide in refrigerator 28 and to provide a chilling medium for fractionator 17, the water content of this chilling medium gradually increases and may become detrimental in that it will corrode refrigerator 28, pipes 25 and 26 and coil 24. To avoid this defect, it is now proposed to provide means for a constant or periodical removal of a portion of the sulfur dioxide introduced through line 30 into refrigerator 28. For this purpose, a pipe 35 preferably equipped with a pump 36 leads from the lower portion of refrigerator 28. As shown in the drawing, this pipe communicates with pipe 11 which conveys the liquid sulfur dioxide to work tank 10. It is, however, to be understood that the sulfur dioxide thus withdrawn will "bleed" from refrigerator 28 and may be removed from the system and delivered as, for example, to an apparatus or structure adapted to separate the water from the liquid sulfur dioxide.

The provision of this "bleeder" permits the withdrawal of a portion of the sulfur dioxide together with the water from refrigerator 28, thus preventing accumulation of water in said refrigerator and the resultant detrimental increase of the water content in the liquid sulfur dioxide in said refrigerator.

As stated above, the invention is not limited to solvent recovery plants, but may be equally employed in connection with any type of refrigerating structures. Thus, it is within the scope of the invention to employ the above described bleeder in connection with a refrigerator used for the chilling of any type of liquid or fluid. As an example, refrigerator 28, provided with the above described bleeder, may be used for the chilling of an oil passing through a coil disposed within said refrigerator. In other words, the invention resides in the provision of water regulating means in any type of a refrigerating system in which the chilling is accomplished by a partial evaporation of the refrigerating liquid containing water.

The above is not to be taken as limiting, but merely as illustrative of the preferred embodiment of the invention, since many changes may be made within the scope of the appended claims.

I claim:

1. In a method for refrigeration and reconditioning a volatile liquid solvent containing fixed gases and water in a quantity insufficient to cause said liquid to become corrosive, the steps of partially evaporating a portion of said volatile liquid to withdraw fixed gases contained therein, conveying another portion of said volatile liquid solvent into a refrigeration zone, evaporating a portion of said volatile liquid in said zone to cause refrigeration therein, withdrawing a portion of the volatile liquid in liquid form from said zone together with the water in said liquid to prevent excessive concentration of the water in said liquid, and bringing the first mentioned evaporated solvent and the fixed gases in thermal contact with the liquid in said refrigeration zone, thereby causing the vaporized solvent to be fractionally condensed from the fixed gases.

2. A method for refrigeration and for reconditioning a volatile liquid solvent containing fixed gases and water in a quantity insufficient to cause said liquid to become corrosive which comprises continuously evaporating a portion of said liquid to withdraw the fixed gases therefrom, fractionating said vapors to condense the volatile solvent thus evaporated, continuously conveying a portion of the first mentioned volatile liquid solvent containing water into a refrigeration zone, evaporating a portion of said volatile liquid in said zone to cause refrigeration therein, employing said refrigerated liquid for the first mentioned fractionation, and withdrawing a portion of the volatile liquid in liquid form from said refrigeration zone together with the water in said liquid to prevent excessive concentration of the water in said liquid.

3. A structure of the class described which comprises a tank for vaporizing a volatile liquid containing fixed gases and water in a quantity insufficient to cause said liquid to become corrosive, a fractionator, means communicating with said tank and said fractionator adapted to convey the fixed gases in a portion of vaporized liquid from said tank to said fractionator, a chilling chamber, means adapted to convey the water containing volatile liquid from the tank to said chamber, means to cause evaporation of a portion of said volatile liquid from said chamber, means associated with said chilling chamber and the fractionator and adapted to cause indirect cooling in said fractionator, and means associated with said chilling chamber and adapted to withdraw therefrom a portion of the liquid in liquid form together with the water contained therein, thereby preventing concentration of the water to a point at which the volatile liquid becomes corrosive.

4. In a structure according to claim 3 wherein the last mentioned means conveys the liquid from the chilling chamber to the tank.

5. In a structure according to claim 3 wherein the fractionator contains a cooling coil in its upper portion, said cooling coil communicating with the chilling chamber, thereby causing the chilled volatile liquid to pass through said coil and cause the condensation of the condensable fractions introduced into the fractionator.

EDWARD G. RAGATZ.